(12) United States Patent
Fredrickson et al.

(10) Patent No.: US 10,504,046 B2
(45) Date of Patent: *Dec. 10, 2019

(54) DYNAMIC BINDING OF PROCESS PATTERNS IN A METHOD ARCHITECTURE

(71) Applicant: International Business Machines Corporation, Armonk, NY (US)

(72) Inventors: J. Todd Fredrickson, Rockledge, FL (US); Peter Haumer, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 1050 days.

This patent is subject to a terminal disclaimer.

(21) Appl. No.: 14/952,865

(22) Filed: Nov. 25, 2015

(65) Prior Publication Data

US 2016/0155075 A1    Jun. 2, 2016

Related U.S. Application Data

(63) Continuation of application No. 11/322,954, filed on Dec. 30, 2005, now Pat. No. 9,251,497, which is a continuation-in-part of application No. 11/238,550, filed on Sep. 29, 2005, now Pat. No. 8,639,726.

(51) Int. Cl.
*G06Q 10/06* (2012.01)
*G06Q 10/10* (2012.01)

(52) U.S. Cl.
CPC ..... *G06Q 10/06316* (2013.01); *G06Q 10/067* (2013.01); *G06Q 10/10* (2013.01)

(58) Field of Classification Search
CPC .... G06F 8/20; G06F 12/0276; G06F 9/44521; G06Q 10/06316
See application file for complete search history.

(56) References Cited

U.S. PATENT DOCUMENTS

| | | | | | |
|---|---|---|---|---|---|
| 5,359,721 | A | * | 10/1994 | Kempf | G06F 9/44521 711/163 |
| 7,210,122 | B2 | * | 4/2007 | Shuf | G06F 12/0276 707/999.202 |
| 2004/0181471 | A1 | * | 9/2004 | Rogers | G06F 8/20 705/31 |

OTHER PUBLICATIONS

Haumer, Peter: IBM Rational Method Composer: Part 1: Kay; http://www-128.ibm.com/developerworks/rational/library; Sep. 26, 2005.

* cited by examiner

*Primary Examiner* — Etienne P Leroux
(74) *Attorney, Agent, or Firm* — Steven M. Greenberg, Esq.; Shutts & Bowen LLP

(57) ABSTRACT

Embodiments of the present invention address deficiencies of the art in respect to method and process management, and provide a data processing system, method, and computer program product for dynamic binding of a capability pattern to multiple processes in a method architecture. In accordance with an embodiment of the present invention, a data processing system configured for dynamic binding of process patterns can include a method management tool. The method management tool can include program code enabled both to compose a capability pattern comprised of at least one activity defined by a plurality of nested and descriptors for source method elements, and to bind an extension activity to the capability pattern in a process model without replicating the activity of the capability pattern in the process pattern.

12 Claims, 3 Drawing Sheets

DYNAMIC BINDING OF PROCESS PATTERNS IN A METHOD ARCHITECTURE

CROSS-REFERENCE TO RELATED APPLICATIONS

This application is a Continuation of U.S. patent application Ser. No. 11/322,954, filed on Dec. 30, 2005, which claims the benefit under 35 U.S.C. § 120 as a continuation-in-part of U.S. patent application Ser. No. 11/238,550, filed on Sep. 29, 2005, the entire teachings of which are incorporated herein by reference.

BACKGROUND OF THE INVENTION

Field of the Invention

The present invention relates to the field of conceptual frameworks and tool support for the management of methods and processes, and more particularly to the systematic management of libraries of related method content and processes.

Description of the Related Art

A method architecture describes a schema for organizing large amounts of descriptions for development methods and processes, such as software engineering, mechanical engineering, business transformation, sales cycles and the like. A development method provides step-by-step explanations for a particular way of achieving a specific development goal under general circumstances such as transforming a requirements document into an analysis model, defining an architectural mechanism based on functional and non-functional requirements, creating a project plan for a development iteration, defining a quality assurance plan for functional requirements, or redesigning a business organization based on a new strategic direction.

A development process takes several of these methods and combines method steps into semi-ordered sequences creating a structure that is specific to temporal development circumstances such as how work is to be organized over time. The structure also can be specific to one type of development project, for instance the characteristics of the development project including development software for an online system versus software and hardware for an embedded system. A process is defined based on a lifecycle, which specifies how method elements such as tasks are being applied and work products are being produced over time by particular roles within the process.

Presently, there are several frameworks available in industry for the documentation of methods and the specification of processes. Commercial method and process management products include the Rational Unified Process Workbench manufactured by IBM Corporation of Armonk, N.Y., United States. International standards for schemas for method and process management systems also exist. The most widely know standard of this field is the Software Process Engineering Meta-Model (SPEM) version 1.1 released by the Object Management Group (OMG). These frameworks have been widely deployed for use in the enterprise. Yet, each has a different architecture and usage. Moreover, none are compatible with one another.

Commercial method and process management products provide for the construction of a model through the manual specification and arrangement of method guidance. To facilitate the rapid construction of a model, some commercial method and process management products permit the assembly of "capability patterns". A capability pattern often is described as a partial process that can be reused more than one time in other processes to rapidly assemble process based on patterns of best method practices or avoid maintenance of repetitive or similar process parts. To utilize a capability pattern, a modeler need only copy the content of the capability pattern and insert the content in the target process. Of course, changes in the underlying capability pattern will not be reflected in the target process. Moreover, the storage size of the model can become bloated in consequence of the repeated use of a capability pattern.

BRIEF SUMMARY OF THE INVENTION

Embodiments of the present invention address deficiencies of the art in respect to method and process management, and provide a novel and non-obvious data processing system, method, and computer program product for dynamic binding of a capability pattern to multiple process patterns in a method architecture. In accordance with an embodiment of the present invention, a data processing system configured for dynamic binding of process patterns can include a method management tool. The method management tool can include program code enabled both to compose a capability pattern of at least one activity defined by sub-activities and one or more references (descriptors) to source method elements, and to bind an extension to the capability pattern in a process without replicating the activity of the capability pattern in the process itself.

In the method architecture, the capability pattern can be defined as a specialization of variability element concept. A variability element can include a variability type such as a "contributes" relationship, an "extends" relationship and a "replaces" relationship. Dynamic binding of capability patterns utilizes "extends" relationships. Moreover, the extension to the capability pattern in the process that applies the pattern can be bound to the capability pattern through a reference that is a specialization of variability element such as activities.

In another embodiment of the invention, a method for binding a capability pattern to multiple process models defined with the method architecture can include defining a capability pattern of activities composed of descriptors to method elements; extending the capability pattern into a process without replicating the activities into the process, and rendering the process in a process view for a methods management tool. Extending the capability pattern in a process without replicating the activities into the process pattern can include referencing the capability pattern from the process, and adding zero or many additional activities or method element descriptors to the process, or suppressing zero or many activities or method element descriptors from the capability pattern interpretation in the process.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, data processing system and computer program product for the dynamic binding of a capability pattern to multiple processes in a method architecture. In accordance with an embodiment of the present invention, a capability pattern can be bound to a process without copying the method elements of the capability pattern into the process. Rather, merely a pattern definition for a capability pattern can be linked into a target process in lieu of replicating the structure of the capability pattern into the target process. In this way, each process can consume less storage space and changes applied to the capability pattern can be reflected dynamically in each target process to which the capability has been applied.

Figure 1:
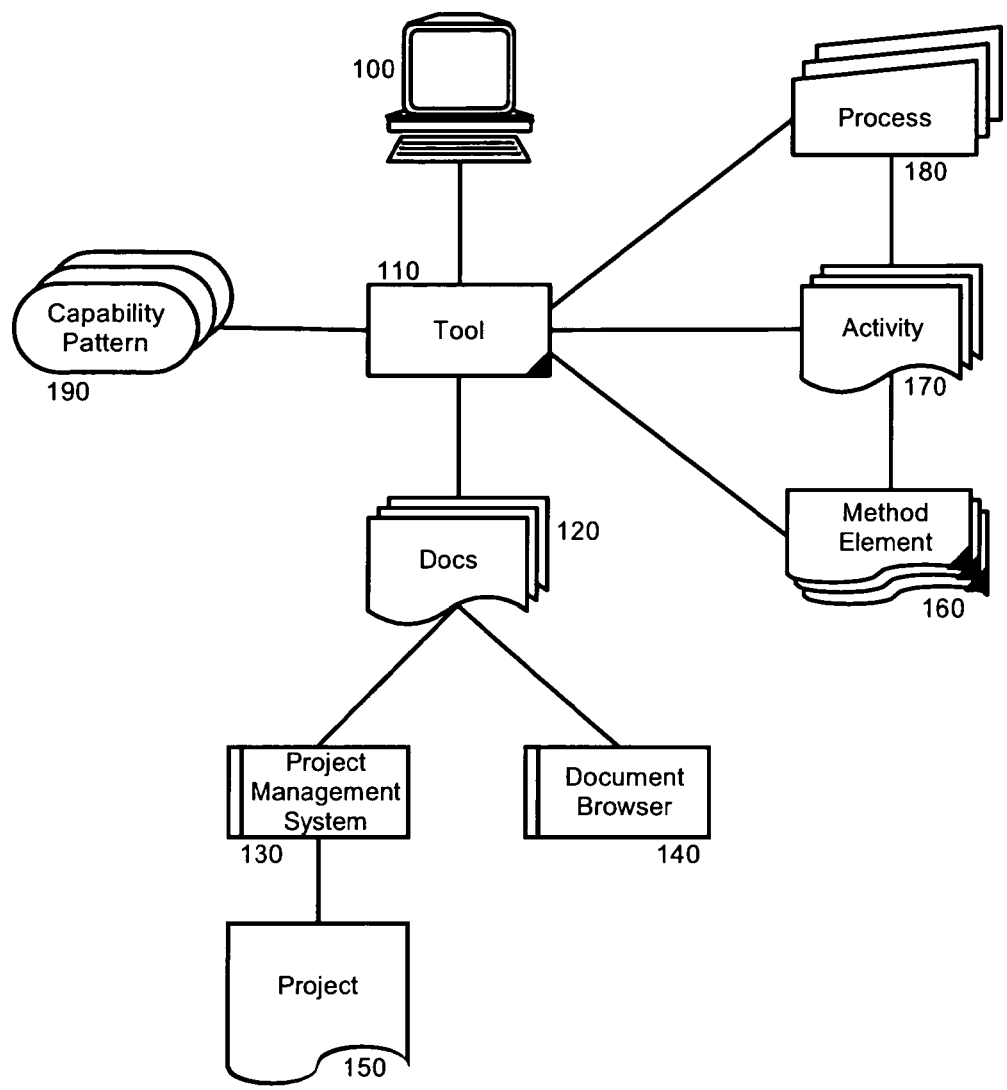
FIG. 1 is a schematic illustration of a methods management system configured for dynamic binding of a capability pattern to multiple process patterns in a method architecture.

In more particular illustration, FIG. 1 is a schematic illustration of a methods management system configured for dynamic binding of a capability pattern to multiple process patterns in a method architecture. Referring to FIG. 1, a computing platform 100 can host a methods management tool 110 configured to arrange method elements 160 into activities 170 using descriptors for one or more processes 180 in a model. The method elements 160 can define project methods and describe core element of methods in terms of roles, tasks, work products and guidance.

Generally, the method elements 160 can provide step-by-step explanations of a project goal, describing how specific project goals can be achieved independently of the placement of the steps within a project lifecycle. As such, the methods management tool 110 can be configured to arrange the method elements 160 to produce one or more process documents 120. The process documents 120 can provide a description of a process and can be viewed within a document browser 140. Alternatively, the documents 120 can be provided as input to a project management system 130 to produce a project plan 150.

Importantly, the methods management tool 110 can further be configured to bind one or more capability patterns 190 to one or more of the processes 180. In this regard, the structure of each capability pattern 190 can be referenced in a corresponding one of the processes 180 without requiring the wholesale copying of the activities and method elements of the capability pattern 190 into the corresponding process 180. Rather, each of the capability patterns 190 merely can be referenced in the corresponding process 180 and changes to the underlying structure of the capability pattern 190 can be applied through the suppression of existing method elements and activities in the capability pattern 190, and the addition of additional method elements and activities to the capability pattern 190. Consequently, changes to each of the capability patterns 190 can be reflected in corresponding processes 180 without requiring the application of the changes directly to the activities and method elements of the corresponding processes 180.

Figure 2:
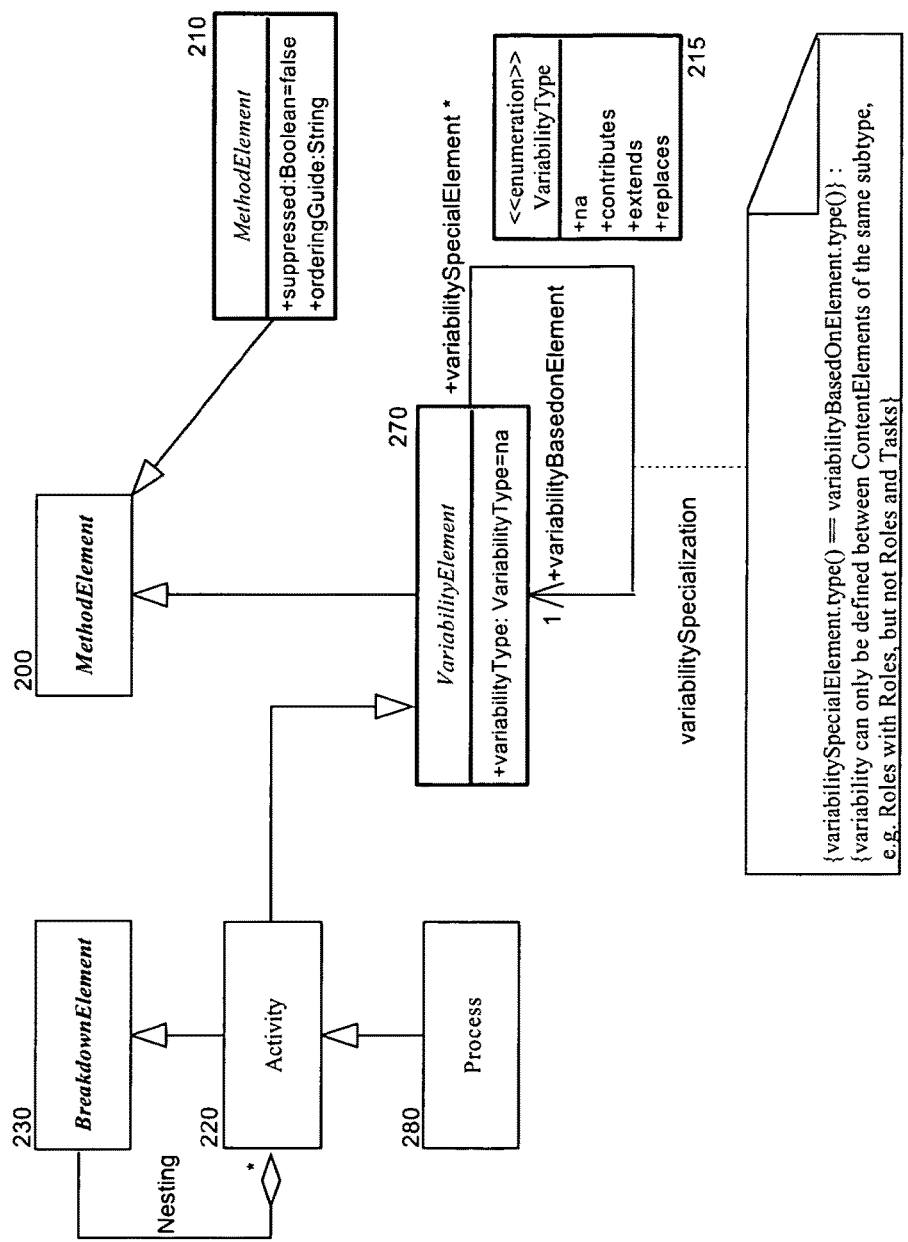
FIG. 2 is a class diagram of the method architecture incorporating the dynamic binding of a capability pattern to multiple process patterns; and, FIG. 3 is a pictorial illustration of the dynamic binding of a capability pattern to multiple different process patterns.

In further illustration, FIG. 2 is a class diagram of the method architecture defining the dynamic binding of a capability pattern to multiple processes. As shown in FIG. 2, a variability element 270 can be an abstract class derived from a method element 200. Operationally, the variability element 270 can provide new capabilities for content variation and extension to content elements or any other method element 200 that derives from the variability element 270. The method architecture can include a base instance of a process 280, that specializes an activity 220 specializing a breakdown structure 230. Additionally, the activity 220 can include nested arrangement of one or more instances of a breakdown element 230 in the method architecture.

Notably, The activity also can specialize the variability element 270 as a variability specialization. Specifically, the variability element 270 can include an association of variability specialization which can be instantiated between two subclasses of the variability element 270 of the same concrete type. As shown in FIG. 2, a variability element subclass on the variability special element side of the relationship between variability element subclasses can define a value for the attribute variability type. The attribute can define the nature of the relationship using a literal from the enumeration variability type 215. In this regard, the nature of the relationship can be a "contributes" relationship, an "extends" relationship, and a "replaces" relationship. The "extends" relationship, in particular, indicates a binding of a capability pattern to a target process referenced by the variability element 270.

In this regard, a capability pattern can be defined as an instance of a variability element 270. Additional instances of the variability element 270 can be bound to the capability pattern by reference only as shown in FIG. 2. Modifications to the capability pattern can be reflected inherently through the variability specialization. Moreover, modifications to the capability pattern in the bound instance of the variability element 270 can be managed through method element 210 where a referenced instance of a method element 210 can be denoted as suppressed. Of course, augmented instances of a method element 210 can be provided at will.

Figure 3:
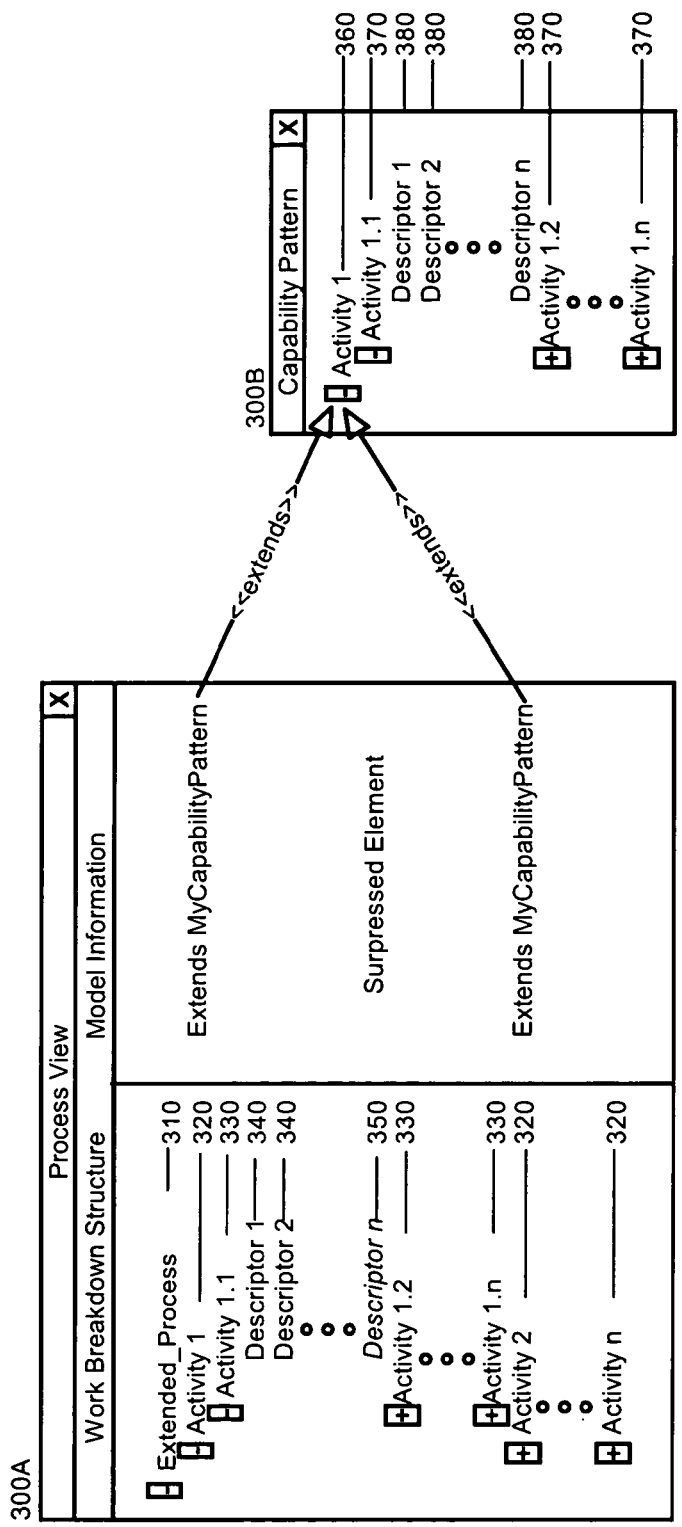

The process of binding a capability pattern to multiple process patterns in a model with the method architecture will be apparent from the pictorial illustration of FIG. 3. As shown in FIG. 3, a process view 300A in a method architecture modeling tool can provide a hierarchical representation of a model having one or more processes 310 (only a single process shown for the sake of illustrative simplicity). Each process 310 can include one or more process activities 320 and each activity 320 can include one or more nested activities 330. Finally, each nested activity can be an arrangement of descriptors for method elements 340, 350 such as roles, work product or tasks.

A capability pattern 300B can be pre-constructed for use in creating processes without requiring the manual specification of the entirety of the process pattern repeatedly in a tedious manner. The capability pattern 300B, like the activities 320 of the the process 310, can include one or more nested activities 370, each nested activity including descriptor references to method elements 380 such as roles, work product or tasks. To create an activity 320 that extends the capability pattern 300B, a reference can be established for each activity 320 in the process where the capability pattern 300B is to be replicated. Only the differences between the capability pattern 300B and the activity 320 must be specified.

For instance, as shown in FIG. 3, a reusable method element 350 corresponding to a descriptor 380 in the capability pattern 300B can be suppressed. Additionally, though not shown in FIG. 3, descriptors 340 to method elements can be added to the activity 320 in addition to those descriptors 380 to method elements specified by the capability pattern 300B. Yet, the content and structure of the capability pattern 300B need not be replicated into the content and structure of the process 310 so as to consume excessive storage space. Moreover, by reference, changes in the capability pattern 300B can be reflected across each process 310 having activities 320 which extend the capability pattern 300B without requiring the systematic manual updating of each extended form of the activities 320.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A data processing system configured for binding a capability pattern to multiple processes, the system comprising a method management tool comprising program code enabled both to compose a capability pattern of at least one activity defined by references to a plurality of source method elements, and to bind an extension to the capability pattern in a process model without replicating the activities of the capability pattern in the process model.

2. The system of claim 1, wherein the process model comprises an arrangement of descriptors mirroring default structural relationships of the source method elements, each of said descriptors configured to permit changes to said arrangement between said descriptors without changing said default structured relationships of said source method elements.

3. The system of claim 1, wherein each of said source method elements comprises one of a task, a role and a work product.

4. The system of claim 2, wherein each of said descriptors in said arrangement inherits from a breakdown element.

5. The system of claim 1, wherein each of the activities comprises an aggregation of breakdown elements in a work breakdown structure.

6. The system of claim 5, wherein each of the activities specialize a variability element.

7. The system of claim 6, wherein a specialized form of the variability element comprises a variability type, the variability type comprising an extends relationship.

8. The system of claim 6, wherein at least one of the activities extends the capability pattern.

9. The system of claim 8, wherein at least one method element in the capability pattern is suppressed in the process bound to the capability pattern to prevent the at least one method element from being inherited.

10. A computer program product comprising a computer usable medium having computer usable program code for binding a capability pattern to multiple process patterns in a model defined by a method architecture, the computer program product including:
 computer usable program code for defining a capability pattern of activities defined by nested activities and descriptors for method elements;
 computer usable program code for extending the capability pattern in a process without replicating the activities into the process; and,
 computer usable program code for rendering the resulting process in a process view for a methods management tool.

11. The computer program product of claim 10, wherein the computer usable program code for extending the capability pattern in a process without replicating the activities into the process, comprises:
 computer usable program code for defining one activity in the process for linking to the capability pattern;
 computer usable program code for referencing the capability pattern in the process from the defined one activity; and,
 computer usable program code for adding at least one additional descriptor for a method element to the defined one activity.

12. The computer program product of claim 10, wherein the computer usable program code for extending the capability pattern in a process pattern for a process without replicating the activities into the process pattern, comprises:
 computer usable program code for referencing the capability pattern from the process; and,
 computer usable program code for suppressing at least one of an activity or descriptor for a method element from the capability pattern in the process.

* * * * *